(12) United States Patent  (10) Patent No.: US 8,866,450 B2
Kirchner  (45) Date of Patent: Oct. 21, 2014

(54) ELECTRONIC DEVICE AND METHOD FOR DC-DC CONVERSION

(75) Inventor: Joerg Kirchner, Mauern (DE)

(73) Assignee: Texas Instruments Deutschland GmbH, Freising (DE)

( * ) Notice: Subject to any disclaimer, the term of this patent is extended or adjusted under 35 U.S.C. 154(b) by 412 days.

(21) Appl. No.: 13/270,311

(22) Filed: Oct. 11, 2011

(65) Prior Publication Data

US 2012/0098512 A1  Apr. 26, 2012

(30) Foreign Application Priority Data

Oct. 21, 2010 (DE) .......................... 10 2010 049 009

(51) Int. Cl.
G05F 1/00 (2006.01)

(52) U.S. Cl.
USPC ........................................................ 323/222

(58) Field of Classification Search
USPC ........................... 323/222, 282, 284–286, 288
See application file for complete search history.

(56) References Cited

U.S. PATENT DOCUMENTS

| | | | |
|---|---|---|---|
| 4,837,495 A * | 6/1989 | Zansky | 323/222 |
| 4,929,882 A * | 5/1990 | Szepesi | 323/222 |
| 6,369,557 B1 | 4/2002 | Agiman | |
| 2003/0231012 A1 | 12/2003 | Corva et al. | |
| 2006/0043943 A1 * | 3/2006 | Huang et al. | 323/222 |
| 2006/0279350 A1 | 12/2006 | Zhang et al. | |
| 2007/0241727 A1 * | 10/2007 | Luo et al. | 323/272 |
| 2008/0001587 A1 | 1/2008 | Cremoux | |
| 2008/0180075 A1 * | 7/2008 | Xie et al. | 323/282 |
| 2009/0146634 A1 | 6/2009 | Audy | |
| 2011/0156687 A1 * | 6/2011 | Gardner et al. | 323/284 |

OTHER PUBLICATIONS

DE Search Report mailed Jun. 10, 2011.

\* cited by examiner

*Primary Examiner* — Jue Zhang
(74) *Attorney, Agent, or Firm* — William B. Kempler; Frederick J. Telecky, Jr.

(57) ABSTRACT

An electronic device for DC-DC conversion including a feedback loop coupled at one side to the inductor for measuring a current through the inductor with a series of an auxiliary capacitor and an auxiliary resistor, a transconductance stage coupled to the auxiliary capacitor for generating a current proportional to a voltage drop across the auxiliary capacitor, wherein the electronic device further includes a ramp resistor coupled to the output of the transconductance stage for generating a ramp voltage across the ramp resistor and a comparator receiving at a first input the ramp voltage, wherein the output of the comparator is coupled to a gate driving stage for driving a power transistor coupled with a control gate to the gate driving stage and with a channel to a switching node of the electronic device.

10 Claims, 8 Drawing Sheets

ELECTRONIC DEVICE AND METHOD FOR DC-DC CONVERSION

CROSS-REFERENCE TO RELATED APPLICATIONS

This patent application claims priority from German Patent Application No. 10 2010 049 009.1, filed Oct. 21, 2010, which is incorporated herein by reference in its entirety.

FIELD OF THE INVENTION

The invention relates to an electronic device and a method for DC-DC conversion

BACKGROUND OF THE INVENTION

In some applications, the switching node of a boost converter (DC-DC converter) is used to drive an additional charge pump that is coupled to the switching node. Such a configuration is shown in FIG. 1. There is a power transistor MOS which is part of the DC-DC converter and controlled according to a boost converter regulation scheme. There is further an inductor L which is coupled between an input voltage VI (input voltage of the DC-DC converter) and the switching node SW. The charge pump basically includes a flying capacitor CFL, and three diodes D1, D2 and D3 as well as two buffer capacitors CBUF1 and CBUF2. The boost converter output BOOSTOUT is fed through diode D1 from switching node SW. This voltage is buffered with buffer capacitor CBUF1. The diodes D2 and D3 in combination with the flying capacitor CFL generate a higher output voltage at node CPOUT which is buffered on the other buffer capacitor CBUF2. Accordingly, the charge pump (basically CFL, D2, D3 and CBUF2) is configured to use the output voltage BOOSTOUT and the voltage at the switching pin SW of the boost converter for doubling the boost output voltage at node CPOUT. In a boost converter configuration having a current mode control mechanism, the current information is typically sensed during the ON-time of the power transistor MOS, either at the power transistor MOS itself or at a sense resistor (not shown) which is coupled in series with the power transistor. A standard peak current control topology is shown in FIG. 2. There is the low side power MOSFET MOS of the DC-DC boost converter. The power transistor MOS is coupled with its channel between the switching node SW and ground. A current information is sensed through the voltage drop of the power transistor MOS. This is performed by the sampling switch SW1 which is coupled between the switching node SW and the negative input VS of amplifier A2. The positive input of amplifier A2 receives a voltage that is derived from the output voltage VOUT of the DC-DC converter. There is a resistive divider R1, R2 coupled to the output node VOUT. The divided voltage FB is fed to the negative input of amplifier A1. The positive input receives a reference voltage VREF. The output of amplifier A1 is fed to the positive input of amplifier A2 as voltage VE (error voltage). A series of a resistor R3 and a capacitor C1 is also coupled to the positive input VE of amplifier A2. The output of amplifier A2 is coupled to the reset input R of an RS-flipflop FF. The set input S of the RS-flip-flop receives an oscillating clock signal from oscillator OSC. The output of RS-flipflop FF is coupled to the control gate of the power MOSFET MOS. The transistor MOS is turned off when the current through the channel of transistor MOS reaches a certain peak value which is determined by the output of the error amplifier A1. The power transistor MOS is then turned on again either by the oscillator OSC or an OFF-timer (not shown). However, if a charge pump is connected to the switching pin SW, an additional current may be injected to the flying capacitor CFL (shown in FIG. 1) which is connected to the power transistor MOS of the boost converter. This additional current may distort the current information of the boost converter and have an impact on the duty cycle. The smaller the duty cycle and the smaller the slope at node VS, the more the regulation may be disturbed due to the additional current being injected into the power transistor MOS. This can adversely affect the operation of the converter and the charge pump or even, dependent on the load of the charge pump and the duty cycle of the boost converter, the converter and the charge pump can become unstable.

SUMMARY OF THE INVENTION

It is a general object of the invention to provide an electronic device and a method for DC-DC conversion which allow stable operation even if a charge pump is coupled to the switching node of a DC-DC converter and current mode control is used.

According to an aspect of the invention, an electronic device for DC-DC conversion is provided that comprises a feedback loop coupled to an inductor for measuring a current through the inductor. The current through the inductor is measured with a series of a capacitor and a resistor. The capacitor is referred to as auxiliary capacitor and the resistor is referred to as auxiliary resistor. A series of the auxiliary capacitor and the auxiliary resistor are coupled in parallel to the inductor, i.e. between the input node of the DC-DC converter and the switching node of the DC-DC converter. A transconductance stage may then be coupled to both sides of the auxiliary capacitor. More specifically, a negative input of the transconductance stage may be coupled to a first side of the auxiliary capacitor and a positive input of the transconductance stage may be coupled to a second side of the auxiliary capacitor. The second side may then be the node between the auxiliary capacitor and the auxiliary resistor. The first side of the auxiliary capacitor may be the side being coupled to the input voltage. Furthermore, there can be a ramp resistor, which is coupled to the output of the transconductance stage. The transconductance stage is configured to generate a current as a function of the voltage drop across the auxiliary capacitor. The current is fed to the ramp resistor. The voltage drop across the ramp resistor can be fed to a comparator which compares the voltage drop with a reference voltage generated by an error amplifier. The output of the comparator is coupled to a gate driving stage for driving a power MOSFET of the boost converter. The power MOSFET may be coupled between a switching node and ground.

This configuration reduces or eliminates the problem of instability if a charge pump is coupled to the switching node of a DC-DC converter. The current information is drawn from the inductor via an auxiliary resistor and an auxiliary capacitor which are coupled in parallel to the inductor. In other words, the transconductance stage can be implemented with a current minor where the gate source voltage of the output minor transistor is modulated with a source follower. The gate of the source follower is connected to the auxiliary capacitor. The current minor may be a PMOS current mirror. The first side of the current minor may be the diode coupled transistor. The second side may be the output transistor of the current minor.

Advantages of the topology of the transconductance stage according to aspects of the invention are small size, low complexity and high speed. Furthermore, it automatically provides a DC current for the ramp resistor that establish a well defined operating point.

In another aspect of the invention, the electronic device may further comprise an error amplifier, a compensation capacitor and a compensation resistor being part of the voltage control loop of the DC-DC converter. There may then be a switch. The compensation capacitor and the compensation resistor may be coupled in series to the output node of the error amplifier which can be coupled to a second input of the comparator. The switch can be configured to selectively feed the ramp voltage to the node between the compensation capacitor and the compensation resistor during startup of the DC-DC converter. This provides a safe and smooth startup procedure with low inrush currents.

The invention also provides a method of performing DC-DC conversion. Accordingly, a voltage drop across an auxiliary capacitance is measured. The auxiliary capacitance is coupled in series with an auxiliary resistor and the series of the auxiliary capacitance and the auxiliary resistor are coupled in parallel to an inductor used for the DC-DC conversion. A current is generated which is a function of the voltage drop across the auxiliary capacitor. The current can be fed to a ramp resistor. The voltage drop across the ramp resistor may then be compared with a reference voltage being indicative of an output voltage of the DC-DC conversion. The comparison result can then be used for switching a power transistor used for the DC-DC conversion. In order to generate the current that is fed to the ramp resistor, a current may be mirrored and the value of the mirrored current can be controlled by source followers coupled to the auxiliary capacitor. The current may then have a constant value and variable value which can be proportional to the voltage drop across the auxiliary capacitor.

BRIEF DESCRIPTION OF DRAWINGS

Further aspects of the invention will appear from the appending claims and from the following detailed description given with reference to the appending drawings.

DETAILED DESCRIPTION OF EMBODIMENTS

Figure 1:
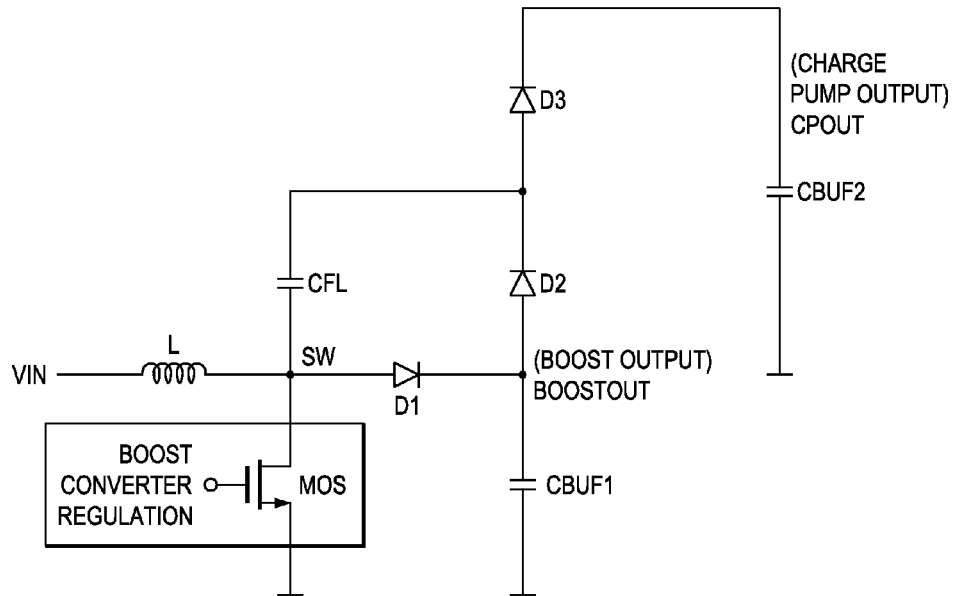
FIG. 1 shows a simplified circuit diagram of a charge pump coupled to an output of a DC-DC converter according to the prior art.
Figure 2:
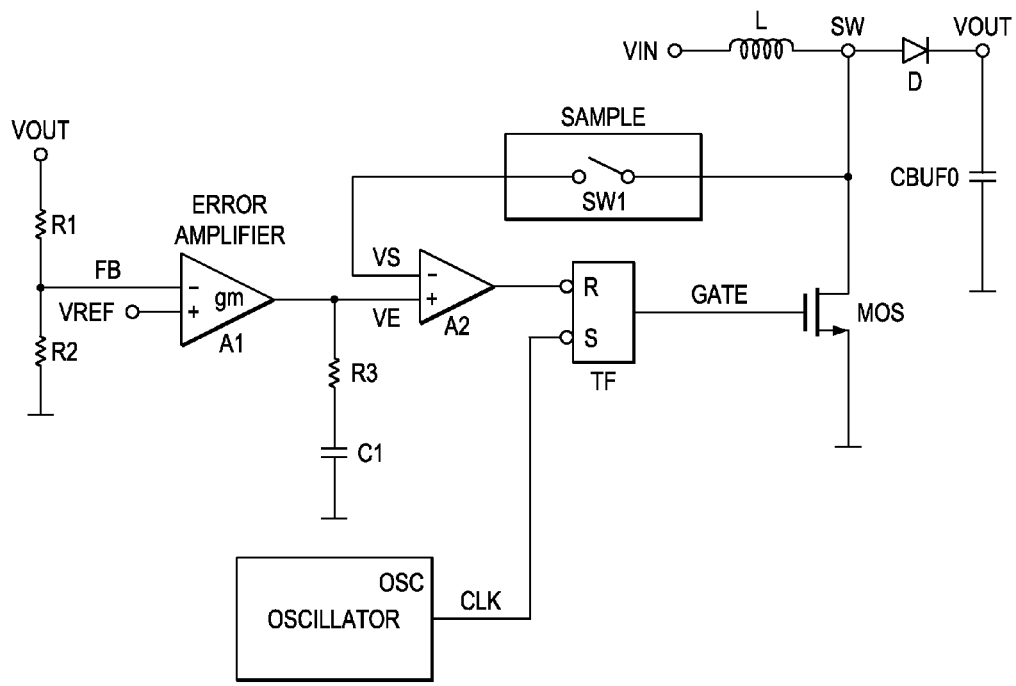
FIG. 2 shows a simplified circuit diagram of a standard current mode control loop of a DC-DC converter.
Figure 3:
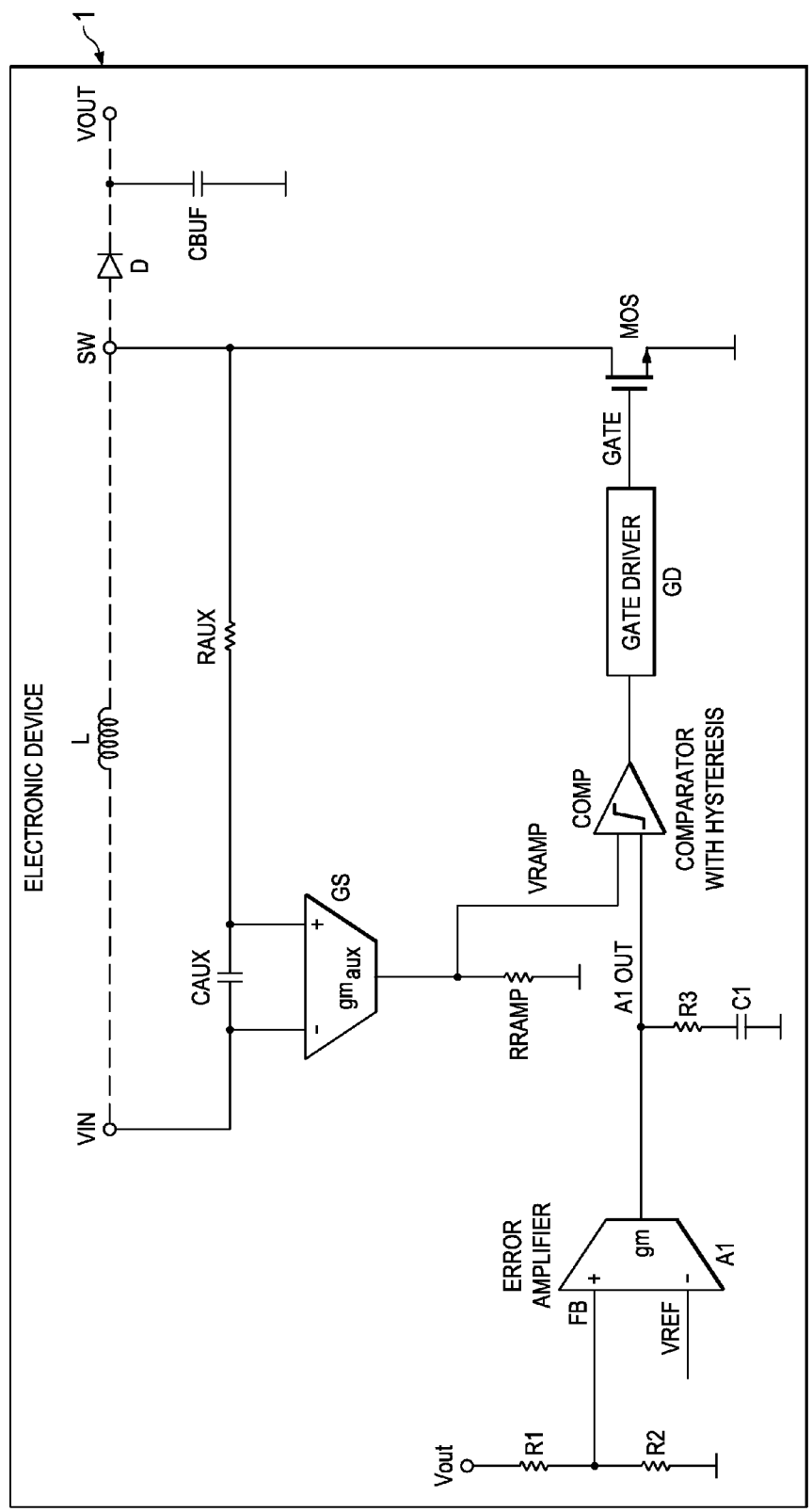
FIG. 3 shows a simplified circuit diagram of an embodiment of the invention.

FIG. 3 shows a simplified circuit diagram of an embodiment of the invention. There is an electronic device 1 for DC-DC conversion, i.e., for example a boost converter. There is a power MOSFET MOS (in this case an NMOS transistor) coupled with its channel between the switching node SW and ground. The DC-DC converter receives the input voltage at node VIN. The inductor L is coupled between the input node VIN and the switching node SW in accordance with a standard boost converter topology. In parallel to the inductor L there is a series of an auxiliary capacitor CAUX and an auxiliary resistor RAUX. A first side of the auxiliary capacitor CAUX is coupled to the input node VIN. A second side of the auxiliary capacitor CAUX is coupled to a first side of the auxiliary resistor RAUX. A second side of the auxiliary resistor RAUX is coupled to the switching node SW. The switching node SW is coupled to an anode of the diode D, which is coupled with a cathode to a buffer capacitor CBUF. The output voltage VOUT is generated at the node between CBUF and the cathode of the diode D. The electronic device may be an integrated circuit. The inductor L and the diode D may not be integrated on the electronic device 1.

There is further a transconductance stage GS. The transconductance stage has a negative input and a positive input. The negative input is coupled to the first side of the auxiliary capacitor CAUX and the positive input is coupled to the second side of the auxiliary capacitor CAUX. The output of the transconductance stage GS is coupled to a ramp resistor RRAMP. The current generated by the transconductance stage GS is therefore fed to the ramp resistor RRAMP in order to generate a voltage drop VRAMP across the resistor RRAMP. The other side of the resistor RRAMP is coupled to ground.

The ramp voltage VRAMP is fed to a comparator COMP. The comparator COMP may have a hysteresis. The other side of the comparator COMP receives a voltage which is derived from the output voltage VOUT of the DC-DC converter. There is a resistive divider R1, R2. The voltage between the series of resistors R1 and R2 is the feedback voltage FB which is fed to the positive input of an error amplifier A1. The negative input of the error amplifier A1 receives a reference voltage VREF. The output of the error amplifier A1 is fed to the other input of the comparator COMP. There is further a series of a resistor R3 and a capacitor C1 which is coupled to the output of the error amplifier A1. R3 and C1 serve to compensate the voltage control loop.

The output of the comparator COMP is fed to a gate driving stage GD. The output of the gate driving stage is fed as signal GATE to the control gate of the power MOSFET MOS. During operation, the mean value of the voltage at switching node SW is equal to the input voltage VIN. Therefore, the average voltage across the auxiliary capacitor CAUX is zero. The auxiliary capacitor is charged and discharged through auxiliary resistor RAUX. As the voltage drop across the auxiliary resistor is equal to the voltage drop across the inductor L, the voltage ripple and slopes across the auxiliary capacitor CAUX are proportional to the inductor current IL. The transconductance stage GS and the ramp resistor RRAMP serve to convert the inductor current information present at the auxiliary capacitor CAUX into a ground referenced voltage VRAMP. The ramp voltage VRAMP is then inversely proportional to the inductor current IL, since the negative input of the transconductance stage is coupled to VIN. An increasing inductor current IL therefore causes a voltage drop VRAMP at the resistor RRAMP.

In order to move the circuit into an operation point in which the error amplifier A1 and the comparator COMP can operate safely, an additional DC current can be fed into the ramp resistor RRAMP.

The comparator COMP may have a hysteresis. The comparator is configured to compare the ramp voltage VRAMP across ramp resistor RRAMP with the output signal of the error amplifier A1. Since the ramp voltage VRAMP is proportional (i.e in this case inversely proportional) to the inductor current IL, the resulting duty cycle is always correct. The RC-network RAUX, CAUX senses the AC (alternating) components of the inductor current IL. Therefore, the error amplifier A1 only regulates the AC part of the inductor current IL. If the output voltage VOUT drops, more current is required and the output of the error amplifier A1 will drop until the output voltage is returned into normal regulation.

The positive input of the error amplifier A1 receives the feedback signal FB derived by the resistive divider R1, R2 from the output voltage VOUT. If the inputs of the transconductance stage GS were exchanged, also the inputs of the error amplifier A1 have to be exchanged. The transconductance stage GS is shown in more detail in FIG. 7.

Figure 4:
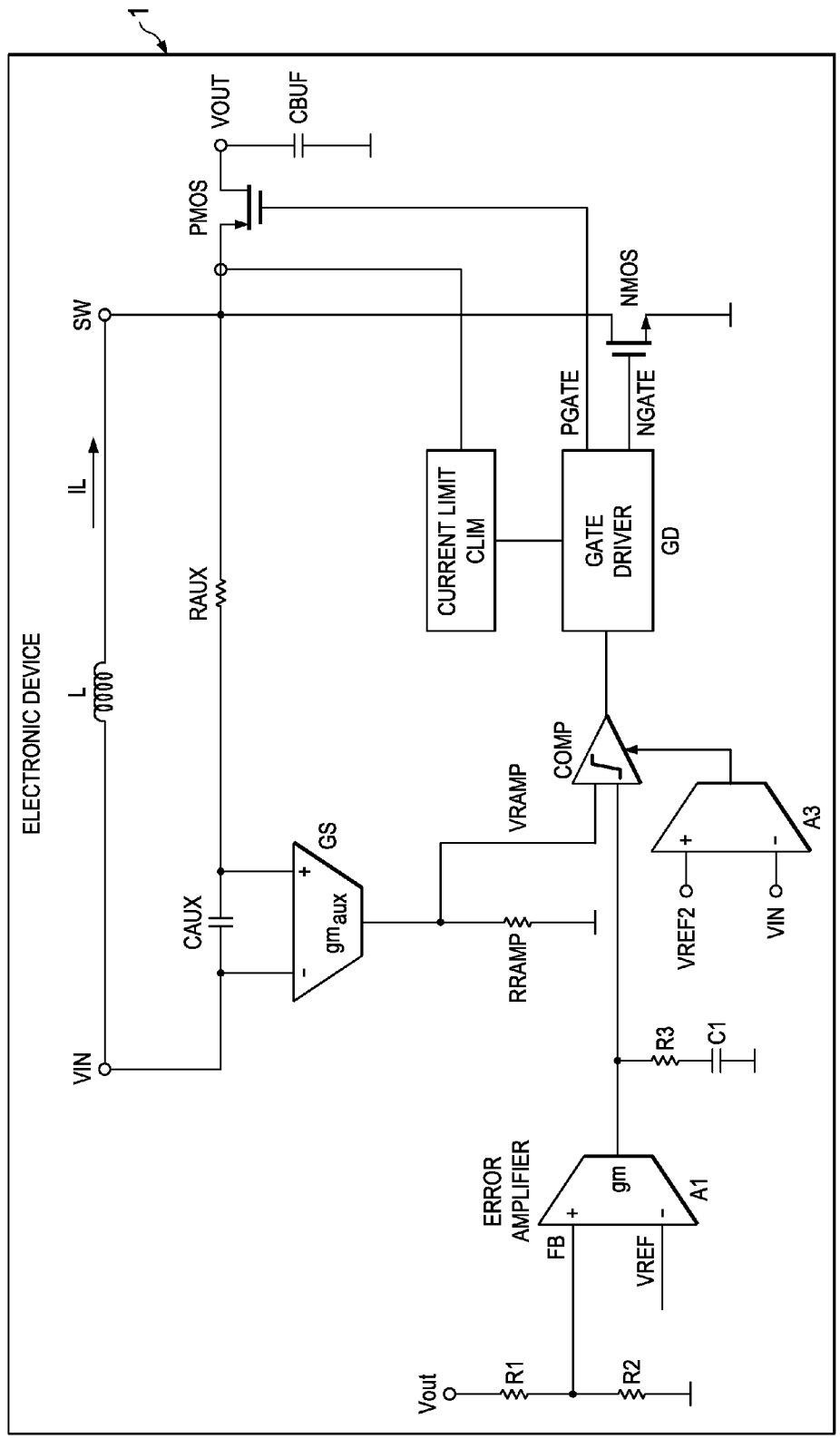
FIG. 4 shows a simplified circuit diagram of another embodiment of the invention.

FIG. 4 shows simplified circuit diagram of another embodiment of the invention. The electronic device 1 for DC-DC conversion of FIG. 3 is slightly adapted. Most parts are similar to those shown in FIG. 3 and parts having the same reference sign are supposed to have similar function. However, instead of the diode D there is a power transistor PMOS. The low side transistor is now referred to as NMOS. Transistor PMOS is driven by signal PGATE and transistor NMOS is driven by signal NGATE. Both signals are generated by gated driver GD. There is further a current limiting stage CLIM. This stage CLIM is configured to sense the current through transistor PMOS, which is the current supplied to node VOUT. If the current exceeds a limit, the current limiting stage provides that the current is switched off. The current limit function may also be implemented in the NMOS power transistor. However, dependent on the specific application, the implementation in the PMOS power transistor has the advantage that during start up, the inductor current is better controlled.

The regulation loop of this boost converter topology combines the advantages of voltage and current mode. On the one hand, the compensation of the loop is as easy as in current mode systems. On the other hand, the topology does not require a sampling network as required by standard current mode systems. This provides several advantages to this topology which voltage mode converters have. So it allows driving an externally connected charge pump from the SW pin without having stability problems. Since no blanking time for the current sampling is needed, the converter can run with smaller on-times than other converters. Still further, no slope compensation is required.

In an aspect of the invention, the comparator COMP has hysteresis. The hysteresis is usually fixed. According to this aspect of the invention, the comparator may have an adjustable hysteresis. The switching frequency of the DC-DC converter can change significantly with a change of the duty cycle and it may fall to very low frequencies which is not desirable in many applications. In order to avoid this drop, the hysteresis of the main comparator COMP is reduced for higher input voltages. The ideal hysteresis for a constant frequency operation would be:

$$VHYSTIDEAL = \frac{VOUT - VIN}{VOUT \cdot f} \frac{VIN \cdot GMAUX \cdot RRAMP}{RAUX \cdot CAUX}, \quad (1)$$

wherein VHYSTIDEAL is the ideal hysteresis, VOUT is the output voltage, VIN the input voltage of the DC-DC converter, RRAMP the ramp resistor, RAUX and CAUX are the auxiliary capacitor and the auxiliaries resistor, f is the switching frequency of the DC-DC converter and GMAUX is the gain/transconductance of the transconductance stage GS.

This ideal hysteresis VHYSTIDEAL is approximated by a gm amplifier which compares the input voltage with a reference voltage VREF3. VREF3 may be, in an embodiment, for example 3.7 V. The gm amplifier A3 is configured to reduce the hysteresis of the main comparator COMP for values of VIN larger than 3.7 V.

Figure 5:
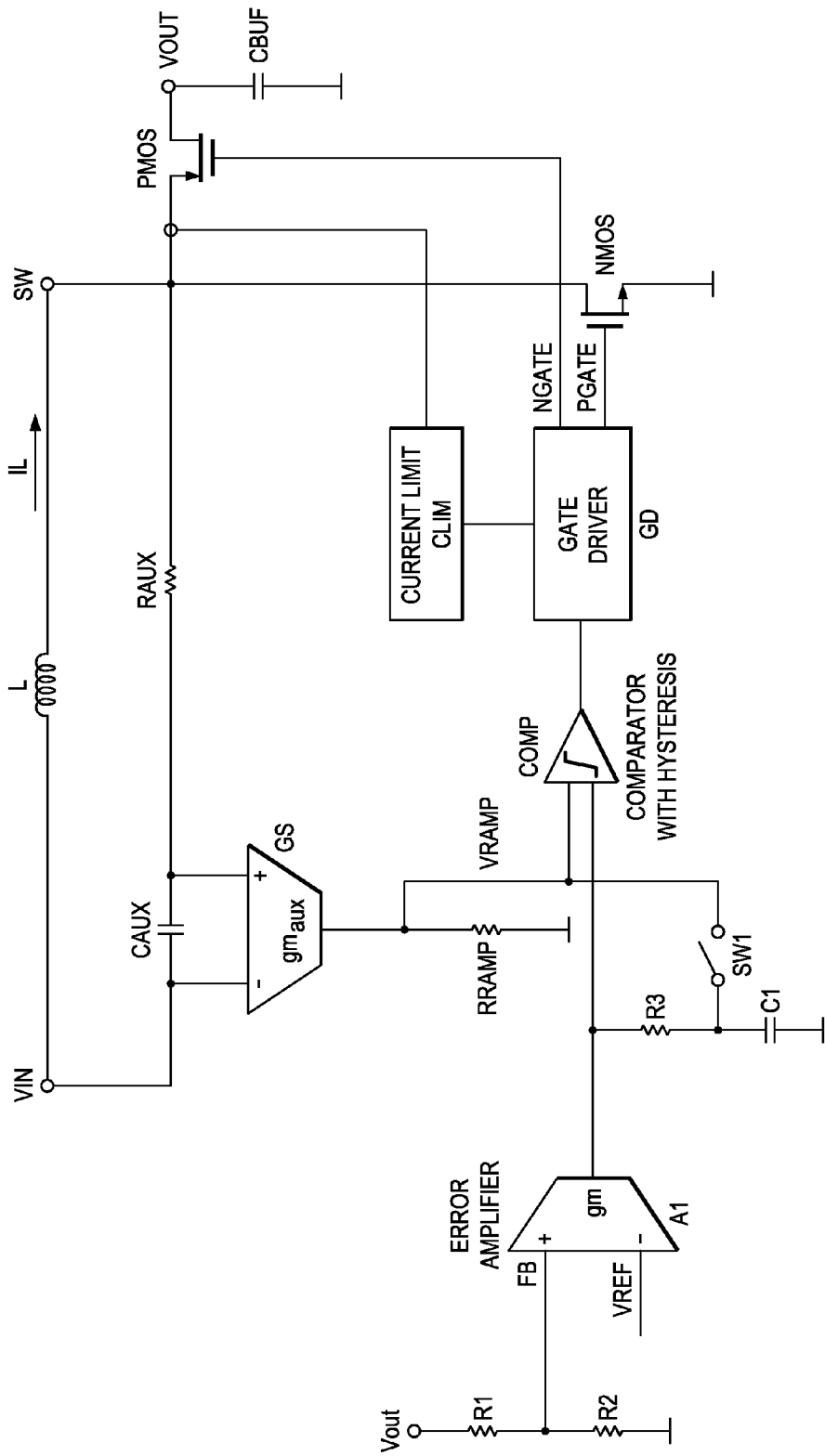
FIG. 5 shows a simplified circuit diagram of another embodiment of the invention.

FIG. 5 shows a simplified circuit diagram of an aspect of the invention. The circuit is basically similar to the circuit of FIG. 4. However, the circuit shown in FIG. 5, has a specific start-up mechanism. A major problem of this kind of DC-DC converters is the high inrush current during startup. For startup it is important that the output voltage VOUT rises in a controlled way and the inrush current is limited. It is also critical to perform the transition from startup into regulation with minimum overshoot and no current spikes. These problems are solved by the switch SW1. The switch SW1 is coupled between node VRAMP and the node between R3 and C1. The switch is configured to connect the two outputs of the comparator COMP through resistors R3. C1 is charged to VRAMP. One side of R3 is connected to the output A1OUT of amplifier A1 and the other side to switch SW1. The other side of the switch SW1 is coupled to VRAMP. A1OUT is then equal to VRAMP.

As long as the output voltage VOUT is too low, the system is out of regulation. The output A1OUT of the error amplifier is then pulled to ground and the main comparator COMP tries to turn the power transistor NMOS permanently on. During this time, the device is operating in a constant ON-time (~200 ns) mode. In the application the ON-time generated peak currents are about 200 mA.

For output voltages VOUT lower than 1.2 V the current limit of the PMOS will not work properly and is disabled. In order to avoid that the inductor current becomes too high, the frequency of the constant ON-time operation is set to 500 kHz. This frequency ensures that the current IL through the inductor can decline to zero and the converter can operate in discontinuous operation.

Once the output voltage VOUT has exceeded the threshold of 1.2 V, the current limit of the power transistor PMOS is activated and is set to 200 mA for limiting the inrush current during startup. The PMOS current limit is a valley current. This means the PMOS transistor remains turned on until the inductor current IL has fallen below this threshold current. After that the PMOS is turned off and the NMOS is turned on again with a constant on time. The inductor current has then a 200 mA peak to peak current with a valley current limit of 200 mA.

When the output voltage rises above the input voltage, the power transistor PMOS starts the normal operation as synchronous rectifier with a reduced current limit operation and a constant on time.

In order to minimize the output voltage overshoot at startup and in order to get a smooth transition into regulation, the compensation capacitor at the output of the error amplifier is pre-charged to the final operating voltage. The switch is closed for the whole start-up phase and C1 is pre-charged in accordance with the target operating point. This operating point is equal to the final operating point when the converter is in regulation. During start up, the output of the error amplifier A1 is pulled to ground and the closer the output voltage gets to the final voltage the closer the output of A1 is to the voltage of C1. Therefore, the transition from open loop to the regulation is automatically smoothened.

After the output voltage VOUT is close to the target voltage, the main comparator COMP starts switching and automatically takes over the regulation. The first switching of the main comparator COMP also disables the startup pre-bias of the compensation capacitor C1. When the main comparator COMP takes over the regulation, no current peaking or other non monotonic conditions occur.

Figure 6:
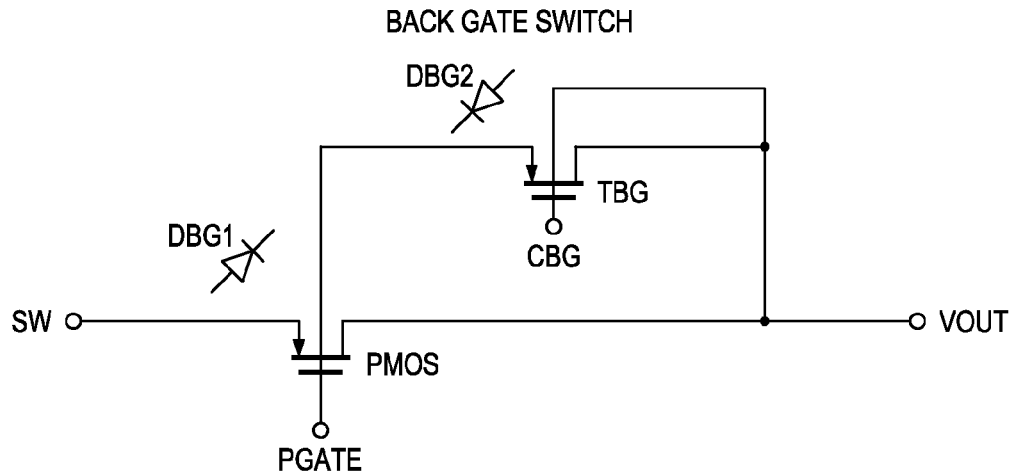
FIG. 6 shows a simplified circuit diagram of an aspect of the invention.

FIG. 6 shows a simplified circuit diagram relating to the configuration of the PMOS transistor shown in FIG. 4 and FIG. 5. The PMOS power transistor can be configured according to the operation mode through an additional backgate transistor TBG. When the DC-DC converter is disabled, input and output have to be isolated from each other. No current should flow from the input VIN (at node SW) to the output VOUT or in the other direction. Therefore the gate of PMOS power transistor and the back gate switch TBG are tied to the maximum voltage (VMAX) of input and output voltage. This ensures that none of the two PMOS transistors PMOS and TBG is turned on and also the back gate diodes DBG1 and DBG2 will not conduct any current in any direction independent which voltage is higher (voltage at SW or at VOUT).

During start-up when the output voltage VOUT is lower than the input voltage VIN (voltage at SW), the gate voltages PGATE and CBG of the two transistors PMOS and TBG, respectively remain at the same voltage level as in the disabled state. The NMOS power transistor is then switching with a constant on-time and current is fed from node SW to VOUT during the off phase. The voltage at SW starts rising up to VIN+VTP until the PMOS power transistor conducts. VTP is the threshold voltage of the PMOS power transistor. The power transistor PMOS acts like a rectifier diode with a large voltage drop (VIN+VTP−VOUT). The back gate of the power transistor PMOS is charged via the back gate diode DBG1 to the voltage of VIN+VTP−Vbe, where Vbe relates to the voltage drop across the backgate diode DBG1. During this type of operation all the current flows through the MOS channel of the power transistor PMOS and no current through the back gate. The transistor only conducts current if a current is built up in the inductor L by power transistor NMOS and the voltage at SW rises significantly above VIN. This allows a controlled startup with limited current.

In normal operation when VOUT>VIN the back gate switch is closed (gate is pulled to ground, i.e. signal CBG is pulled to ground) and the power transistor PMOS is turned on and off as synchronous rectifier.

In order to minimize the output voltage overshoot at startup and get a smooth transition into regulation, the compensation capacitor at the output of the error amplifier is pre-charged to the final operating voltage. The configuration is shown in FIG. 4. additional back gate switch in several ways Due to the manner, the duty cycle is generated and if the PMOS is implemented as shown in FIG. 6, the converter can also be used to generate smaller output voltages than input voltages.

Figure 7:
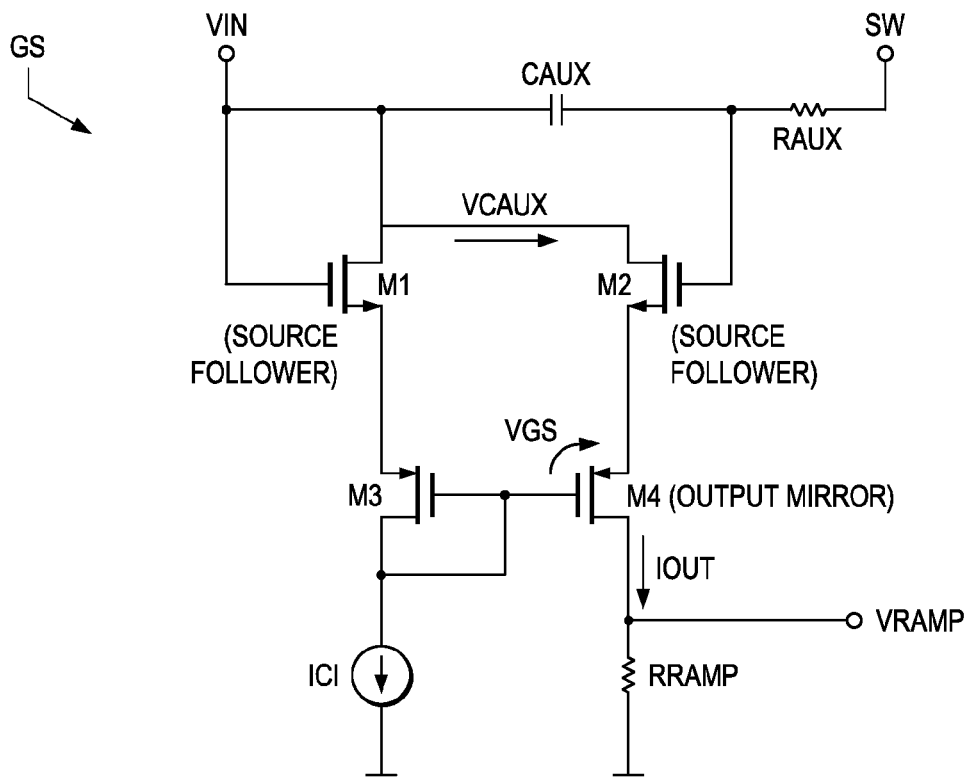
FIG. 7 shows a simplified circuit diagram of a transconductance stage according to aspects of the invention.

FIG. 7 shows a simplified circuit diagram of a transconductance stage GS according to aspects of the invention. There is a current source ICI which is coupled to the drain and gate of a transistor M3. Transistor M3 is a PMOS transistor. Transistor M3 is coupled to another transistor M4 (also PMOS transistor). Transistors M3 and M4 form a PMOS current mirror. The source of transistor M3 is coupled to the source of transistor M1. Transistor M1 is an NMOS transistor. The gate of transistor M1 is coupled to the node VIN. The node VIN is the input node of the DC-DC converter receiving the input voltage. The drain of transistor M1 is also coupled to VIN. There is the auxiliary capacitor CAUX which is coupled with one side to VIN and with the other side to RAUX and the gate of transistor M2. The drain of transistor M2 is coupled to the drain of transistor M1. Accordingly, the drain of transistor M2 is also coupled to node VIN. The source of transistor M2 is coupled to the source of transistor M4. The drain of transistor M4 is coupled to the ramp resistor RRAMP. The auxiliary resistor RAUX is coupled with one side to the gate of transistor M2 and one side of the auxiliary capacitor CAUX and with the other side to switching node SW. Accordingly, there is a current minor (PMOS current mirror) M3, M4. Furthermore, there is are two source followers M1 and M2. The gate source voltage of the output transistor M4 of the current mirror M3, M4 is modulated by the source followers M1, M2. The gate of the source follower M2 is coupled to the auxiliary capacitor CAUX. The transconductance stage GS is very small, has high speed and automatically provides the DC current which is required to provide a safe operating point for the error amplifier A1 shown in FIGS. 3, 4 and 5.

Figure 8:
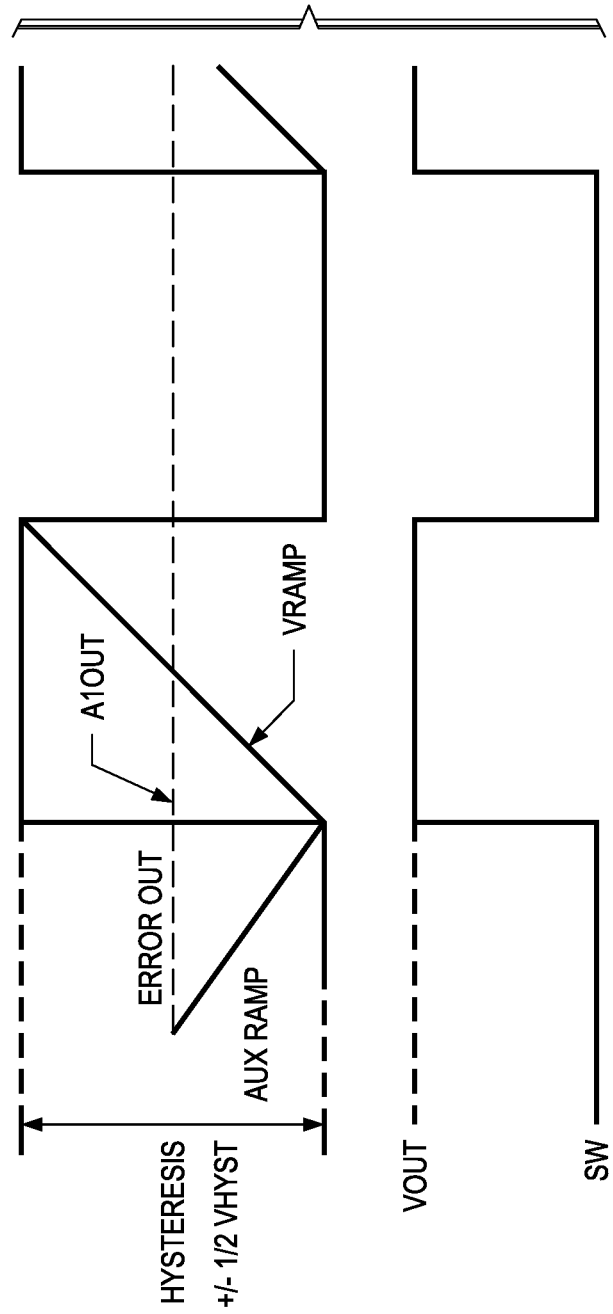
FIG. 8 shows a diagram illustrating the behavior of the signals VRAMP and error amplifier output in PWM mode.

FIG. 8 shows VRAMP and A1OUT in normal operation for the embodiment shown in FIG. 3. In normal pulse width modulation (PWM) operation, the switching pin SW alternates between ground and VOUT plus the diode voltage. The voltage ramp at the ramp resistor RRAMP will then move around the error amplifier output voltage +/−½ VHYST with the corresponding duty cycle.

If the DC-DC converter enters discontinuous conduction mode, the ramp voltage VRAMP remains flat as the voltage at the switching node SW approximates and remains at VIN. The ramp at the resistor RRAMP will then not reach the upper threshold of the error amplifier output voltage plus ½VHYST and the power transistor MOS is then not turned on anymore. The DC-DC converter remains in this state until the error amplifier output voltage drops below the threshold again. The transition from continuous to discontinuous mode is also referred as a transition from PWM-mode to pulse frequency mode (PFM-mode). If a diode is used as a rectifying element, the transition occurs automatically.

Figure 9:
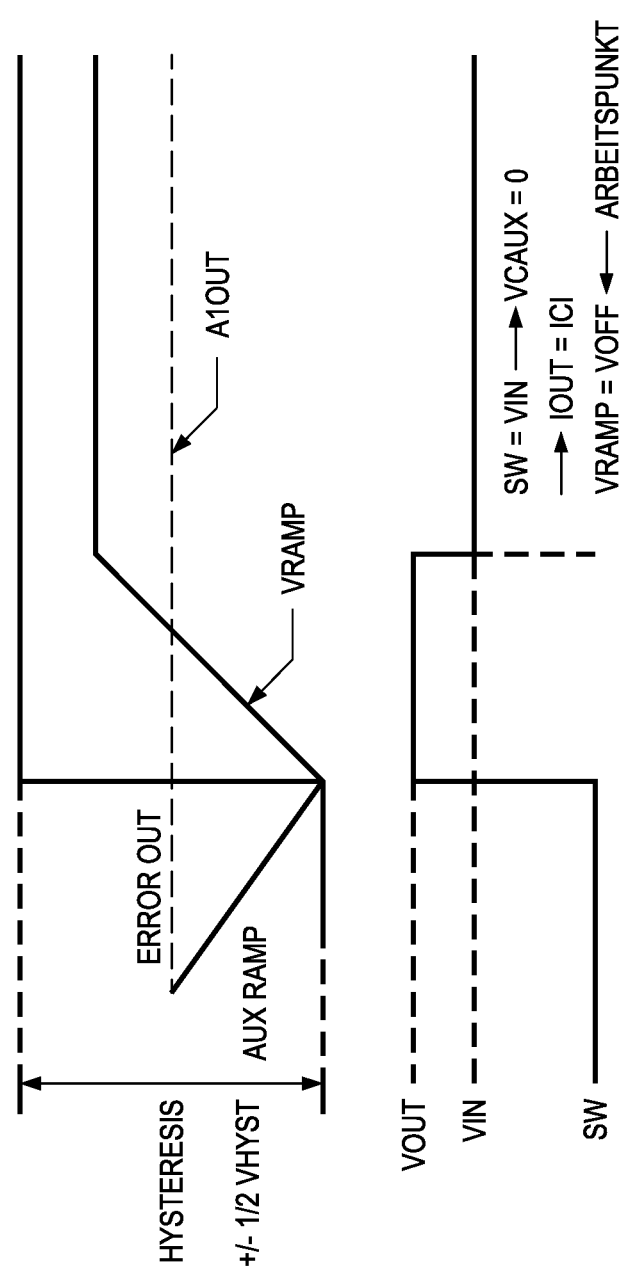
FIG. 9 shows a diagram illustrating operation of the DC-DC converter with very small loads in a power save mode.

FIG. 9 illustrates pulse frequency mode (PFM) operation for the embodiment of FIG. 3. This situation relates to a configuration in which the DC-DC converter has only a very small or no load. If there is no significant load at the DC-DC converter output, the DC-DC converter will switch only very few times. The operation is then at the limit to discontinuous conduction mode. The ripple at the output VOUT of the converter in this mode is very low because the operating point is within a few mV around the error amplifier output A1OUT, if the device enters PFM. This is the reason, why a load transient in PFM mode is regulated out very fast. An additional advantage is that the device has not to enter a special operating mode and no additional circuits or logic gates are necessary. In order to avoid the PMF mode, an additional synchronous rectifier may be added that allows current to flow back. The impedance of this rectifier or switch can be relatively high because it only needs to conduct half of the inductor ripple current.

The switching frequency of the converter is given by the constant hysteresis and the voltage slope across the auxiliary capacitor CAUX. For calculation of the frequency, the ON-time of the boost converter is examined. The delay of the comparator is neglected. The ON-time can then be calculated as $$TON = \frac{RAUX \cdot CAUX \cdot VHYST}{VIN \cdot GMAUX \cdot RAUXRAMP} \quad (2)$$

The duty cycle d of the boost converter is then given as $$d = TON \cdot f = \frac{VOUT + VD - VIN}{VOUT + VD} \quad (3)$$

VD is the voltage drop across the external rectifier diode D (FIG. 3). The frequency can then be calculated as $$f = \frac{1}{TON} \cdot \frac{VOUT + VD - VIN}{VOUT + VD} \quad (4)$$

Figure 10:
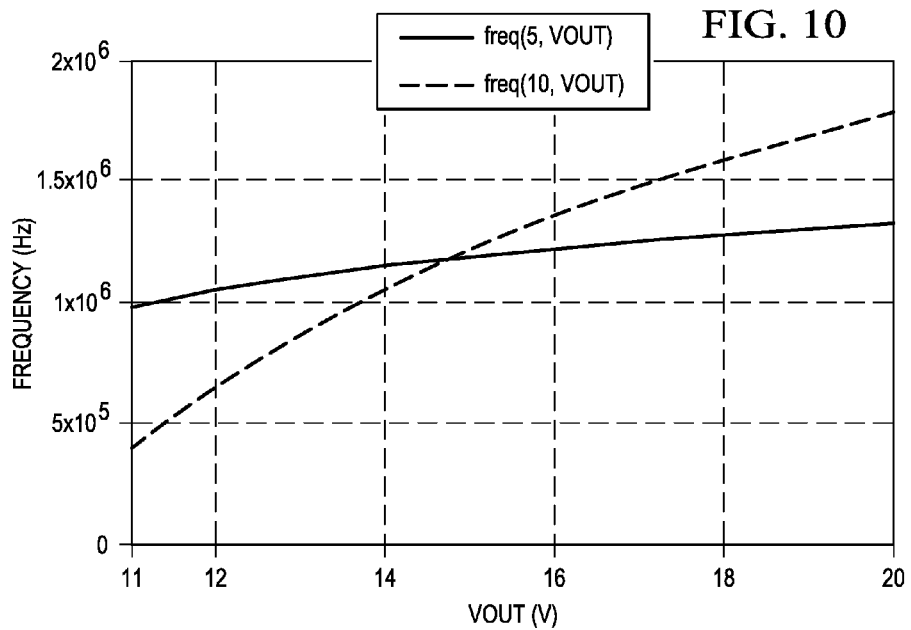
FIG. 10 shows frequency over output voltage characteristic.

The resulting frequency f changes with the duty cycle d of the converter. The smaller the duty cycle d the higher the frequency f. FIG. 10 shows the relationship between the resulting frequency f as a function of the output voltage VOUT. There is the output voltage VOUT between 0 and 20 V. The frequency ranges from about $5 \times 10^5$ to $2 \times 10^6$ Hz. The two curves relate to 5 V (solid line) input voltage and to 10 V (dashed line) input voltage VIN.

The peak-to-peak current of the converter can also be determined. During an ON-time, the voltage across the inductor L is VIN. This means that $$IPP = TON \cdot \frac{VIN}{L} = \frac{RAUX \cdot CAUX \cdot VHYST}{L \cdot GMAUX \cdot RRAMP} \quad (5)$$

The peak-to-peak current ripple IPP is always constant and independent of the input voltage VIN and the output voltage VOUT.

Figure 11:
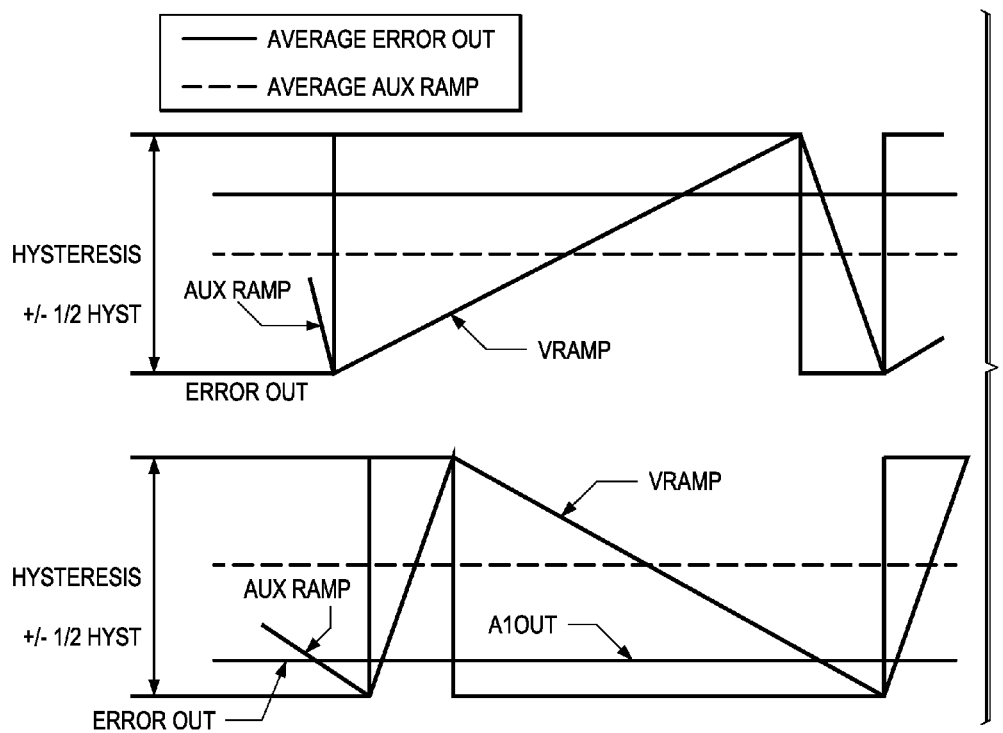
FIG. 11 shows the input signals of the modulator for high and low duty cycle.

FIG. 11 shows a diagram illustrating the input signals of the DC-DC converter for high and low duty cycle values. The upper diagram relates to a high duty cycle value and the lower diagram to a low duty cycle value. Accordingly, the voltage VRAMP increases slowly and decreases with a sharp slope in the upper diagram while in the lower diagram the increase is steep and the decrease rather slow. By averaging the input signals over a period, the gain can be determined. The average of the auxiliary ramp is always ½ of the hysteresis. The average of the error amplifier changes proportionally with the duty cycle from zero to the hysteresis. This means $$GMOD = \frac{\partial d}{\partial VRAMP} = \frac{1}{VHYST} \quad (6)$$

The inner regulation loop using the feedback from the switching pin SW to the main comparator COMP generates a feedback ramp VRAMP which is equivalent to the inductor current IL. The feedback provides a low pass filter function with a pole. The frequency of the pole can be designed to be around 5 kHz. This pole frequency is essential for the whole loop stability. For a good compensation, the pole frequency should be close to the LC double pole (C being the buffer capacitance CBUF). Since the loop of the control mechanism according to the invention has only a single pole, the inner loop is always stable.

Although the invention has been described in detail, it should be understood that various changes, substitutions and alterations can be made thereto without departing from the spirit and scope of the invention as defined by the appended claims.

The invention claimed is:

1. An electronic device for DC-DC conversion comprising: a feedback loop coupled at one side to the inductor for measuring a current through the inductor by a series of an auxiliary capacitor and an auxiliary resistor; a transconductance stage coupled to the auxiliary capacitor for generating a current proportional to a voltage drop across the auxiliary capacitor, wherein the electronic device further comprises a ramp resistor coupled to the output of the transconductance stage for generating a ramp voltage across the ramp resistor and a comparator receiving at a first input the ramp voltage, wherein the output of the comparator is coupled to a gate driving stage for driving a power transistor being coupled with a control gate to the gate driving stage and with a channel to a switching node of the electronic device, wherein the transconductance stage comprises a current source coupled to a current mirror and a first transistor coupled to a first side of the current mirror and to the auxiliary capacitor and a second transistor coupled to the first side of the auxiliary capacitor and to the second side of the auxiliary capacitor and a second side of the current mirror and wherein the ramp resistor is fed with a current output from the current mirror.

2. The electronic device according to claim 1, further comprising an error amplifier, a compensation capacitor and a compensation resistor being part of voltage control loop for the DC-DC converter, and a switch, wherein the compensation capacitor and the compensation resistor are coupled in series to the output node of the error amplifier which is coupled to a second input of the comparator and wherein the switch is configured to selectively feed the ramp voltage to the node between the compensation capacitor and the compensation resistor during startup of the DC-DC converter.

3. The electronic device of claim 1, wherein the ON-time can then be calculated as:

$$TON = \frac{RAUX \cdot CAUX \cdot VHYST}{VIN \cdot GMAUX \cdot RAUXRAMP}$$

wherein VHYST is the hysteresis, VIN the input voltage of the DC-DC converter, RAUX and CAUX are the auxiliary capacitor and the auxiliaries resistor, f is the switching frequency of the DC-DC converter and GMAUX is the gain/transconductance of the transconductance stage GS.

4. The electronic device of claim 3, wherein the frequency can be calculated as:

$$f = \frac{1}{TON} \cdot \frac{VOUT + VD - VIN}{VOUT + VD}$$

wherein VD is the voltage drop across the external rectifier diode D, VOUT is the output voltage, VIN the input voltage of the DC-DC converter.

5. The electronic device of claim 1, wherein an ideal hysteresis for a constant frequency operation would be:

$$VHYSTIDEAL = \frac{VOUT - VIN}{VOUT \cdot f} \frac{VIN \cdot GMAUX \cdot RRAMP}{RAUX \cdot CAUX},$$

wherein VHYSTIDEAL is the ideal hysteresis, VOUT is the output voltage, VIN the input voltage of the DC-DC converter, RRAMP the ramp resistor, RAUX and CAUX are the auxiliary capacitor and the auxiliaries resistor, f is the switching frequency of the DC-DC converter and GMAUX is the gain/transconductance of the transconductance stage GS.

6. An electronic device for DC-DC conversion comprising:
a feedback loop coupled at one side to the inductor for measuring a current through the inductor by a series of an auxiliary capacitor and an auxiliary resistor;
a transconductance stage coupled to the auxiliary capacitor for generating a current proportional to a voltage drop across the auxiliary capacitor, wherein the electronic device further comprises a ramp resistor coupled to the output of the transconductance stage for generating a ramp voltage across the ramp resistor and a comparator receiving at a first input the ramp voltage, wherein the output of the comparator is coupled to a gate driving stage for driving a power transistor being coupled with a control gate to the gate driving stage and with a channel to a switching node of the electronic device, further comprising an error amplifier, a compensation capacitor and a compensation resistor being part of voltage control loop for the DC-DC converter, and a switch, wherein the compensation capacitor and the compensation resistor are coupled in series to the output node of the error amplifier which is coupled to a second input of the comparator and wherein the switch is configured to selectively feed the ramp voltage to the node between the compensation capacitor and the compensation resistor during startup of the DC-DC converter.

7. The electronic device of claim 6, wherein the ON-time can then be calculated as:

$$TON = \frac{RAUX \cdot CAUX \cdot VHYST}{VIN \cdot GMAUX \cdot RAUXRAMP}$$

wherein VHYST is the hysteresis, VIN the input voltage of the DC-DC converter, RAUX and CAUX are the auxiliary capacitor and the auxiliaries resistor, f is the switching frequency of the DC-DC converter and GMAUX is the gain/transconductance of the transconductance stage GS.

8. The electronic device of claim 7, wherein the frequency can be calculated as:

$$f = \frac{1}{TON} \cdot \frac{VOUT + VD - VIN}{VOUT + VD} \quad (4)$$

wherein VD is the voltage drop across the external rectifier diode D, VOUT is the output voltage, VIN the input voltage of the DC-DC converter.

9. An electronic device for DC-DC conversion comprising:
a feedback loop coupled at one side to the inductor for measuring a current through the inductor by a series of an auxiliary capacitor and an auxiliary resistor, wherein the mean value of voltage at a switching node is equal to an input voltage and average voltage across the auxiliary capacitor is substantially zero, voltage ripple and slopes across the auxiliary capacitor being proportional to the inductor current;
a transconductance stage coupled to the auxiliary capacitor for generating a current proportional to a voltage drop across the auxiliary capacitor, wherein the electronic device further comprises a ramp resistor coupled to the output of the transconductance stage for generating a ramp voltage across the ramp resistor and a comparator receiving at a first input the ramp voltage, wherein the output of the comparator is coupled to a gate driving stage for driving a power transistor being coupled with a control gate to the gate driving stage and with a channel to the switching node of the electronic device.

10. A method of performing DC-DC conversion, comprising the steps of:
measuring a voltage drop across auxiliary capacitance which is coupled in series with an auxiliary resistor and the series of the auxiliary capacitance and the auxiliary resistor are coupled in parallel to an inductor, wherein the mean value of voltage at a auxiliary node is equal to an input voltage and average voltage across the auxiliary capacitor is substantially zero, voltage ripple and slopes across the auxiliary capacitor being proportional to the inductor current;
generating a current as a function of the voltage drop across the auxiliary capacitor;
feeding the current to a ramp resistor, comparing the voltage drop across the ramp resistor with a reference voltage being indicative of an output voltage of the DC-DC conversion; and
using the comparison result for switching a power transistor used for the DC-DC conversion.

* * * * *